United States Patent [19]

Greider

[11] 4,079,831
[45] Mar. 21, 1978

[54] LOOSE PIECE FEEDING MECHANISM

[75] Inventor: Kenneth Herr Greider, Conestoga, Pa.

[73] Assignee: AMP Incorporated, Harrisburg, Pa.

[21] Appl. No.: 769,978

[22] Filed: Feb. 18, 1977

Related U.S. Application Data

[63] Continuation of Ser. No. 606,393, Aug. 21, 1975.

[51] Int. Cl.² ............................................ B65G 47/24
[52] U.S. Cl. .................................. 198/396; 198/443; 221/167
[58] Field of Search ............... 198/396, 391, 392, 756, 198/757, 443; 221/161, 167, 168, 169, 170, 203

[56] References Cited

U.S. PATENT DOCUMENTS

| | | | |
|---|---|---|---|
| 517,828 | 4/1894 | Keith | 221/167 X |
| 648,883 | 5/1900 | Reenstierna | 221/167 X |
| 962,928 | 6/1910 | Stewart | 221/167 |
| 2,695,730 | 11/1954 | Cavanagh | 221/168 |
| 2,752,618 | 7/1956 | Stern | 198/288 |
| 3,578,142 | 5/1971 | Burgess | 198/220 BC |

Primary Examiner—John J. Love
Assistant Examiner—Douglas D. Watts
Attorney, Agent, or Firm—Donald W. Phillion

[57] ABSTRACT

A loose piece feeder comprising a slotted, inclined track extending down at an angle α from a cylindrically-shaped reservoir holding small terminals or pieces to an applicator station. The slotted track enters the reservoir through a window in the bottom of the side wall thereof and extends across the cylinder bottom along a chord line thereof which lies below the axis of the tilted reservoir. A brush oscillates back and forth across the track slot within the reservoir and, when moving away from said window, tends to brush away improperly seated connectors, and, when moving towards said window, tends to properly seat said connectors in said track slot and to push said properly seated connectors out of said window and down said inclined track towards said work station, aided by vibrating the entire system.

2 Claims, 6 Drawing Figures

LOOSE PIECE FEEDING MECHANISM

CROSS-REFERENCE TO RELATED APPLICATION

This application is a continuation of application Ser. No. 606,393 filed Aug. 21, 1975, by Kenneth Herr Greider and entitled "Loose Piece Feeding Mechanism".

BACKGROUND OF THE INVENTION

This invention relates generally to a mechanism for feeding small parts to an installation station and more particularly to a feeding mechanism for feeding small connector receptacles to an installation station of an automatic insertion machine.

In the prior art small connector elements, such as miniature spring female sockets, have been supplied in loose piece fashion to an installation station by means of a feeding mechanism including an inclined track and a cup-shaped reservoir positioned at the top thereof. The inclined track includes a pair of rails with a slot therebetween which extends from the reservoir to the installation or work station. The small connectors are generally cylindrical in shape, open at one end and having an enlarged diameter, rim-like cover or cap at the other end. The cylindrical portion passes in the slot between the two rails with the rim-like cap riding on the top surface of the two rails. In this manner the connectors are supplied from the cup-like reservoir to the work station. In such prior art mechanism, the reservoir is attached rigidly to the track with a window in the side wall of the reservoir so that the slots and the two rails in effect are continuous through the side of the reservoir and along the bottom of said reservoir. Thus, the bottom of the reservoir, in effect, contains an extension of the tracks and forms a straight, continuous slot down which the connectors can slide, by a combination of vibration and gravity.

The slot in the reservoir is positioned radially with respect to the cup-like or cylindrically-shaped reservoir. A rotating brush is also located in the reservoir and is made to continuously sweep across the reservoir floor, thereby pushing the connectors into the slot. The brush, which usually has its axis in the center of the bottom of the cylindrical reservoir, can also be moved in an oscillatory fashion so that it sweeps back and forth across the slot, thereby more effectively brushing the connectors into the slot and also removing those connectors which have not positioned themselves in the proper attitude within the slot.

One of the problems encountered with the prior art structure lies in the fact that the extension of the slots from the tracks into the cup lies in a single common plane. The angle of the slot is, in prior devices, about 40°, and it has been found that jamming of the connectors in the slots within the reservoir occurs occasionally as the connectors are vibrated or brushed into the slot. Once the connectors are properly positioned in the slot, however, and pass through the window in the wall of the reservoir and begin their journey down the track, jamming very seldom occurs.

Another difficulty of prior art devices appears to arise because the slot within the reservoir is radial with respect to the circularly-shaped bottom of the reservoir, and the fact that the brush rotates around an axis located in the center of the reservoir bottom. Thus, the bristles of the brush pass over the slot substantially perpendicular to the direction of said slot. It has been found that such a movement of the brush does not remove jammed connectors with sufficient effectiveness. Furthermore, the perpendicular motion of the brush bristles perpendicularly across the slot does not tend to push the connectors down the track and towards the work station. It has been found that most automatic insertion machines on the market can install the socket connectors faster than they can be delivered to said work stations by currently known feeding mechanisms.

BRIEF STATEMENT OF THE INVENTION

It is a primary object of the invention to provide a connector feeding mechanism or the type described which will virtually eliminate jamming of the connectors.

It is another purpose of the invention to increase the rate of supply of said connectors from the rservoir to the work station.

It is a further aim of the invention to increase the overall reliability both as to minimization of jamming of the connectors and also as to rate of speed of the connectors from the reservoir to the work station.

It is a fourth object of the invention to improve feed mechanisms of the type described generally.

In accordance with the invention there is provided a cylindrically-shaped reservoir and a track consisting of two rails with a slot therebetween extending from the elevated reservoir down to the work station where installation of the connectors occurs. The track enters the cylindrical reservoir through a window in the wall thereof and extends across along a chord line on the circular bottom of the reservoir, rather than along the diameter as in the prior art. The axis of the cylindrical reservoir, is positioned at approximately 15° with respect to the horizontal plane as compared with the 40° inclination of the track leading from the reservoir to the work station. Further, the cylindrical reservoir is positioned so that its axis is inclined at an angle of approximately 30° with respect to the vertical plane passing through the slot in said track, with the track slot lying below the center of the cylindrical reservoir floor.

Since the track slot is continued through a window in the reservoir and then along the bottom of the reservoir, that part of the slot within said reservoir is also at an angle of 15° with respect to the horizontal plane. Further, the top surface of the rails adjacent the slot within the reservoir lie in a plane which intersects the vertical plane passing through the main track slot in a line which is perpendicular to said vertical plane, thereby in effect, enabling the connectors suspended in that portion of the track slot within the reservoir to be suspended in the vertical plane at an approximately 15° slope with respect to the horizontal plane. Thus, the connectors tend to move out of the reservoir by gravity and then down the main track to the work station, also by gravity, aided by vibration.

The remaining portion of the bottom of the reservoir (other than the track portion) lies in a plane substantially perpendicular to the axis of the reservoir, i.e., at an angle of 30° with respect to the horizontal. Thus the connectors tend to move towards the track slot within the reservoir as a result not only of gravity but also because of the vibrating of the reservoir, and the action of the oscillating brush provided therein. The said brush is rotatable about the center of the bottom of the reservoir and is provided with a driving source which moves said brush in an oscillatory manner. More specifically, the brush first sweeps in a clockwise direction across the track slot within the reservoir and away from the window in the reservoir wall, thereby tending to push connectors into the slot and to remove from the vicinity of the slot any connectors which have not seated themselves properly in said slot. Then the brush will reverse its direction and move back across the slot, tending to push connectors into the slot and also to push the connectors positioned in said slot along said slot, out the window in the wall of the reservoir, and then down the main track to the work station.

Since the slot is located along a chord line on the low side of the center of the bottom of the reservoir, both the vibrating of the reservoir and the action of the brush will tend to continuously move the connectors towards the said slot.

In accordance with a feature of the invention that portion of the tracks forming the slot within said reservoir is a continuation of the main track and is mated to the reservoir by milling away a portion of the bottom of the reservoir to provide for a proper positioning of the track continuation therein.

In accordance with another feature of the invention the track, including the main inclined portion and that portion extending along the bottom of the reservoir, can be removed and replaced by another complete track unit, which also includes a main track portion and a continuation portion within the reservoir, but which has a different size slot constructed to handle a different sized connector.

In accordance with another feature of the invention the reservoir can be removed from a given track and replaced with another reservoir of a different size and configuration adapted to handle connectors of different sizes and configurations.

BRIEF DESCRIPTION OF THE DRAWINGS

The above-mentioned and other objects and features of the invention will be more clearly understood from the following detailed description thereof when read in conjunction with the drawings in which.

DETAILED DESCRIPTION OF THE INVENTION

Figure 1:
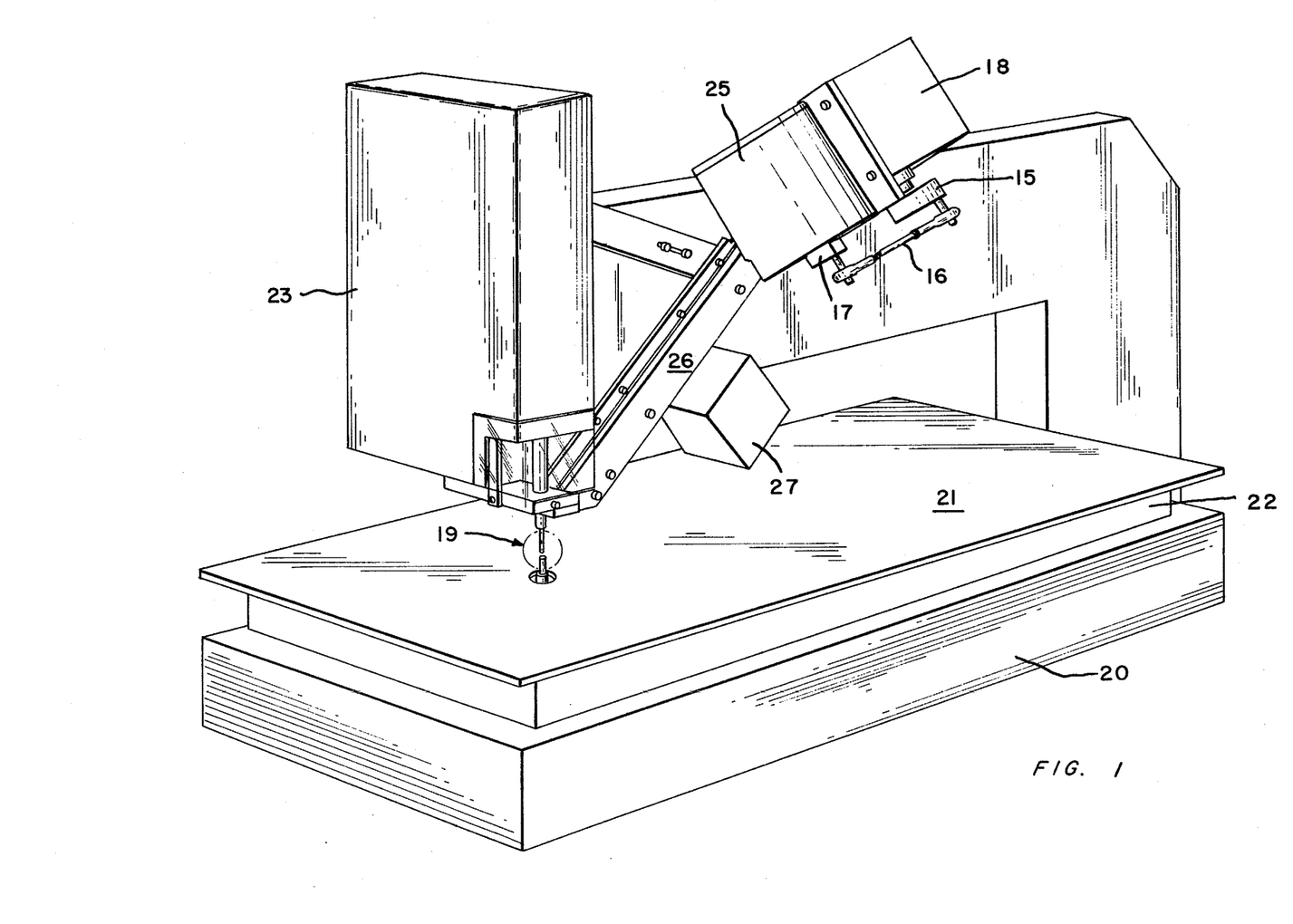
FIG. 1 is a perspective view of a typical machine in which the feeding mechanism of the invention can be employed.

Referring now to FIG. 1 there is shown a machine employing the feed mechanism of the invention. The machine consists of a base 20 supporting a table 21 which can be moveable in its own plane to locate rectangular coordinate points in a circuit board (not shown) mounted thereon and into which circuit board the connectors are to be applied. The position of table surface 21 can be controlled by control mechanism represented generally by reference character 22. A head 23 can contain a reciprocating ram and an applicator means 19 for applying the connector sockets into the circuit board. The head 23 is supported to the base 20 by means of supporting arm 24.

The mechanism for feeding the connectors, such as miniature type sockets, to the applicator 19 in head 23, consists of a main track 26 which is supplied with connectors from an elevated reservoir 25. Vibrating means 27 functions to vibrate the main track 26 and the reservoir 25 to agitate the connectors contained in the reservoir and to then move them down the main track 26 to the work station at applicator 19. The motor 18 drives a brush 83 (FIG. 3) in reservoir 25 in an oscillatory rotary motion through linkage 16 which is connected at one end to motor driven cam 15 and at the other end to cam 17 which is in turn connected to the brush axis.

Figures 2, 2A:
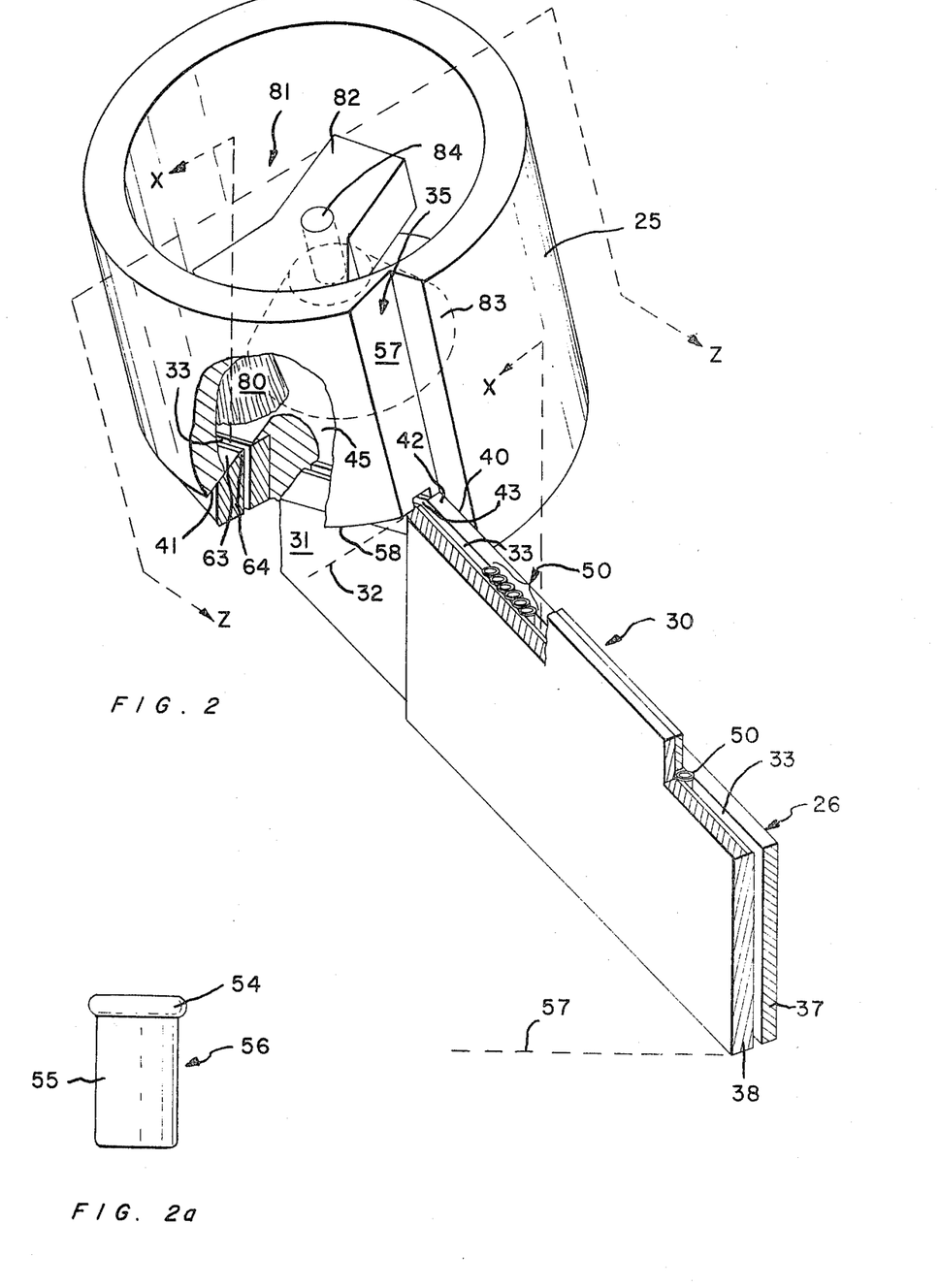
FIG. 2 is a perspective view of the basic structure of the invention including the track and the cup-like reservoir with portions broken away to show the relationship between the reservoir and the track.
FIG. 2a is a perspective view of a typical connector having a suitable shape for use in the feeder means of the present invention.

Referring now to FIG. 2 there is shown a more detailed drawing of the reservoir 25 and the main track 26 of FIG. 1. The main track 26 can be seen to consist of two rails 37 and 38 with a slot 33 formed therebetween. It is within this slot 33 that the connectors 50 ride down into the work station 19 underneath the head 23 of FIG. 1.

A typical miniature (mini) spring socket connector is shown in FIG. 2a. Such socket is designated generally by reference character 56 and has a main cylindrical-shaped body 50 capped by a circular, button-shaped element 54 which has a diameter larger than the main body 55. The diameter of the main body 55 of the connector is smaller than the width of the slot 33 of FIG. 2 whereas the diameter of the head 54 of the connector is larger than the width of slot 33. Consequently, the connectors will ride down the slot or groove 33 suspended on the edges of the top surfaces of the adjacent rails 37 and 38 by means of the button-shaped head 54, as shown in FIGS. 2 and 2a.

Returning again to the general discussion of the structure of FIG. 2, it can be ssen that not only the track 26 consists of two rails 38 and 37, but further that it is formed of two main sections 30 and 31 which are angled with respect to each other along dotted line 32 as said track enters the wall of the reservoir 25.

Thus the slot 33 extends from the work station up to the reservoir 25 by means of the two rails 37 and 38 and then into the reservoir 25 at a lesser angle with the horizontal; said lesser angle being approximately 15° with respect to the horizontal plane 57. The connectors are caused to fall into the slot 33 within the reservoir 25 and then, by the action of oscillating brush 80 and the vibrating of the slot in the reservoir 25 and the main track 26, such connectors are caused to move along slot 33, to the right in FIG. 2, through the window 43 in the wall of reservoir 25, and then down slot 33 to the work station 19 as shown in FIG. 1. The brush 81 has an arm 82 supported on shaft 84, which rotatably held in conically-shaped bearing 83. The arm 82 supports bristles 80 which sweep around the edge of the bottom of reservoir 25. The top surface of the two rails 37 and 38 with respect to the bottom surface 45 of the reservoir is such that the connectors will drop into the slot 33 in the proper position for their journey down the track 26 to the work station 19 of FIG. 1, with the body 55 of the socket resting substantially perpendicularly in the slot 33 and supported on the top edges of rails 37 and 38 by the button-like top 54 of the counter.

It is to be noted that the angle of the plane of most of the bottom surface 45 of the reservoir 25 has a particular relationship with the horizontal plane and does not lie in the same plane as the top surfaces 37 and 38 of the rails 37 and 38. The reason for the difference in the planar positions of the top surfaces of rails 37 and 38 and the bottom surface 45 of the reservoir 25 will be discussed in more detail in connection with FIGS. 3 and 4. However, before referring to FIGS. 3 and 4 it should be noted that because of this difference in planar positions of the top surfaces of rails 37 and 38 and the bottom surface 45 of reservoir 25, a portion of the reservoir 25 must be cut away along certain planes to enable the proper positioning of the track 26 with the reservoir 25. Thus, the following milling or cutting of the reservoir 25 is effected. A slot 35 (FIG. 2) having a flat surface 57 is formed vertically in the side wall of reservoir 25 to facilitate the mating of the main track 26 with the reservoir 25 where said main track 26 is angled along line 32. The dotted line 32 lies substantially in the same plane as the surface 57 as will be shown more clearly in FIG. 4.

Figure 3:
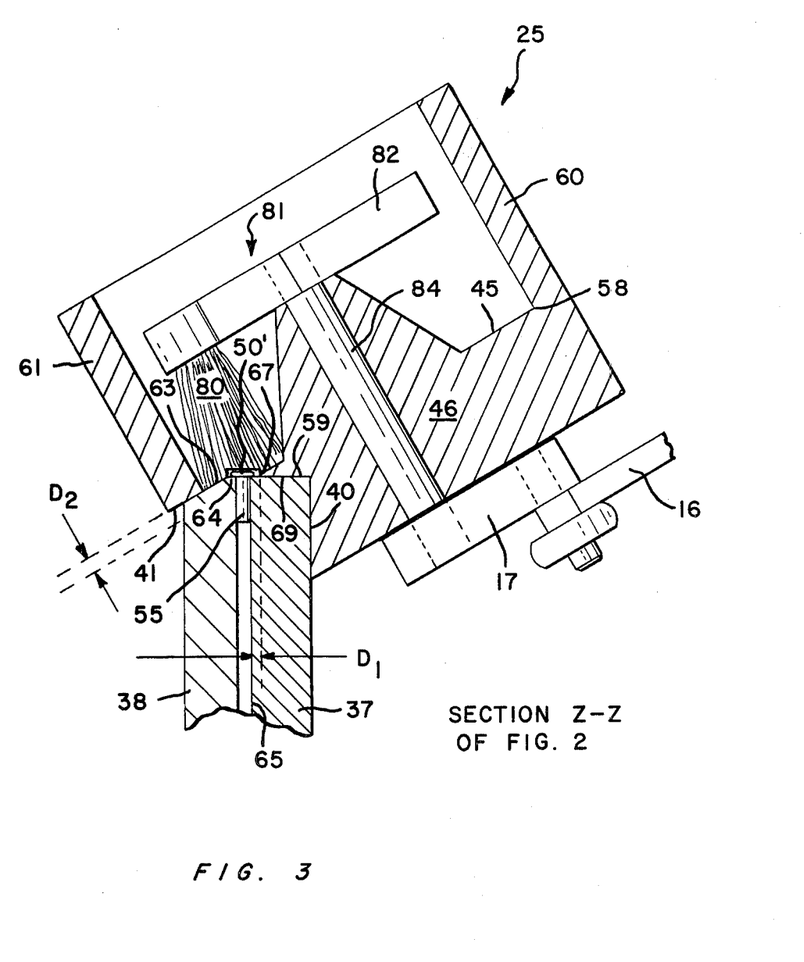
FIG. 3 is a sectional view of the structure of FIG. 2 taken along the plane Z—Z of FIG. 2.

The reservoir 25 is also milled at an angle along a vertical surface 40, which milling is needed since the axis of the reservoir 25 is inclined towards the viewer at approximately 30° (as can be seen in FIG. 3) from a vertical angle passing through the slot 33 and vertical to the horizontal plane 56. A third cut in the reservoir 25 is made in a plane substantially perpendicular to the axis of cup 25 and forming the surface 41 and the edge 58 which can be seen to be the edge of the bottom surface of the wall of the reservoir 25, on the plate 38 side of slot 33.

Reference is made to FIG. 3 for further clarification of the various cuts and milling of the reservoir 25 and the mating of the track 26 therewith. More specifically, FIG. 3 is a sectional view of FIG. 2 taken along the plane Z—Z which includes the axis of the reservoir 25 and which is perpendicular to the afore-mentioned vertical plane passing through the slot 33.

In FIG. 3 the milled surfaces 40 and 41 appear as lines since they lie in planes perpendicular to the plane of the drawing of FIG. 3. The third plane of cutting of the reservoir 25 is designated generally by the line 59 which is also perpendicular to the plane of the drawing of FIG. 3. Thus, the bottom portion of the reservoir 25 is cut along three different planes defined by the reference characters 40, 59 and 41 of FIG. 3, all of which planes extend completely through the reservoir 25 and which intersect each other along substantially parallel lines.

The track consisting of rails 37 and 38 are formed to mate with the portion cut away from the bottom of the reservoir 25 as defined by the planes 40, 59 and 41. It can be seen that the plane of cutting 59 intersects the surface 45 of the bottom of the reservoir 25 along a line which can be seen as the point 67 in FIG. 3. The point 67 appears as a point since the intersection of the milled plane 59 and the bottom surface 45 results in a line perpendicular to the plane of FIG. 3. It is also to be noted that the intersecting line 67 is spaced from the inner wall of the track rail 37 by distance $D_1$. Such distance $D_1$ extends across the entire bottom surface of the reservoir 25 and is of sufficient width to permit the edge of the button-like top portion 54 of the mini spring socket 55 to ride thereon. The other side of said button-like top portion 55 rides on the flat portion 64 of the other track rail 38. It is of importance that the surface areas 64 and 70 be substantially horizontal, this is, horizontal at the intersection therewith of a plane normal to said vertical plane passing through the slot 33. If such surfaces 64 and 70 were not horizontal as defined in the preceding sentence, then the connector 50 might tilt to the right or left in the slot 33 of FIG. 3 and become jammed, thereby preventing its progression down the main track 26, as shown in FIG. 2, to the work station 19 of FIG. 1.

As the track 26 enters into the wall of the reservoir 25 at the intersecting line 32, as shown in FIG. 2, the top surface of rail 38 is beveled as shown in FIG. 3. Such beveled surface is defined by reference character 63. The cutting of the reservoir 25 along the plane 41, as shown in FIG. 3, in such that it will abut against the beveled surface 63 and will have substantially the same angle thereof with respect to the horizontal plane and further will be substantially parallel with the plane of the reservoir bottom 45 as shown in FIG. 3. It is to be noted however, that the plane of the surfaces 41 and 63, while being parallel with the plane of the reservoir bottom 45, are removed therefrom by some distance designated generally by $D_2$, as shon in FIG. 3, which is of the order from 0.010 inches to 0.050 inches, depending upon the particular design perimeters being employed.

The purpose of the beveled surface 63 is to reduce the amount of friction and distortion upon the bristles 80 of the brush 81 which is rotatably mounted upon shaft 84 and driven by drive source 18 (FIG. 1) through linkage 16 and cam 17. More specifically, if the surface 33 were horizontal, that is merely an extension to the left in FIG. 3 of surface 64, the bristles of the brush would become warped and set and thereby lose some of their efficiency when brushing other areas of the bottom surface 45 of the reservoir 25 which would not have beveled edges. Worded in another manner, most of the flat bottom surface of the reservoir 25 meets the walls 60 and 61 of such reservoir 25 at right angles which obviously presents a greater sweeping distance than would be the case if the surface area 63 were a horizontal extension of surface area 64.

Since in one preferred embodiment of the invention the maximum width of the beveled surface 63 is approximately ¼ inch the bristles 80 of brush 81 can easily sweep any connectors lying at the bottom of surface 63 against the wall 61 of reservoir 25 across and into the slot 33 of the track.

Figure 4:
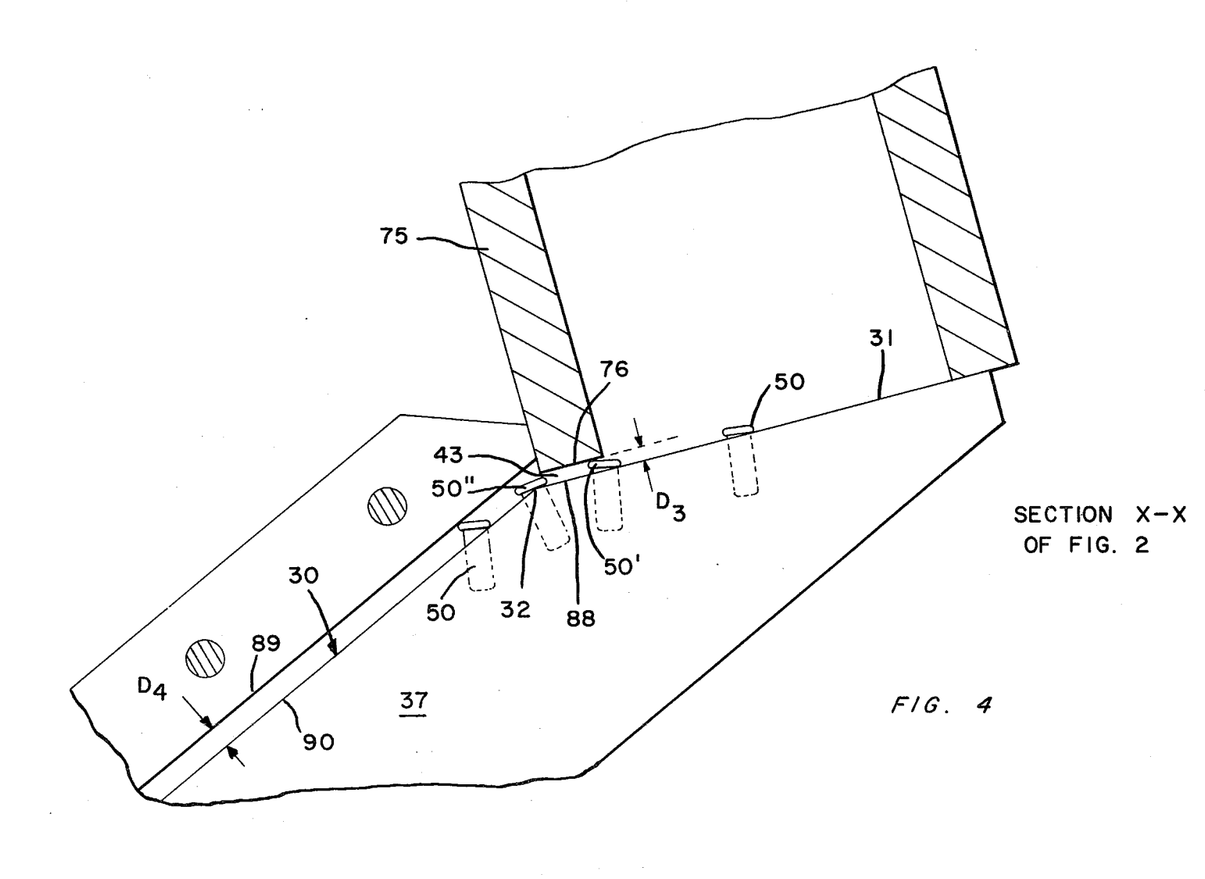
FIG. 4 is a sectional view of the structure of FIG. 1 taken along the plane X—X of FIG. 1 and showing the relationship between the reservoir and the track at the junction where said track enters the reservoir.
Figure 5:
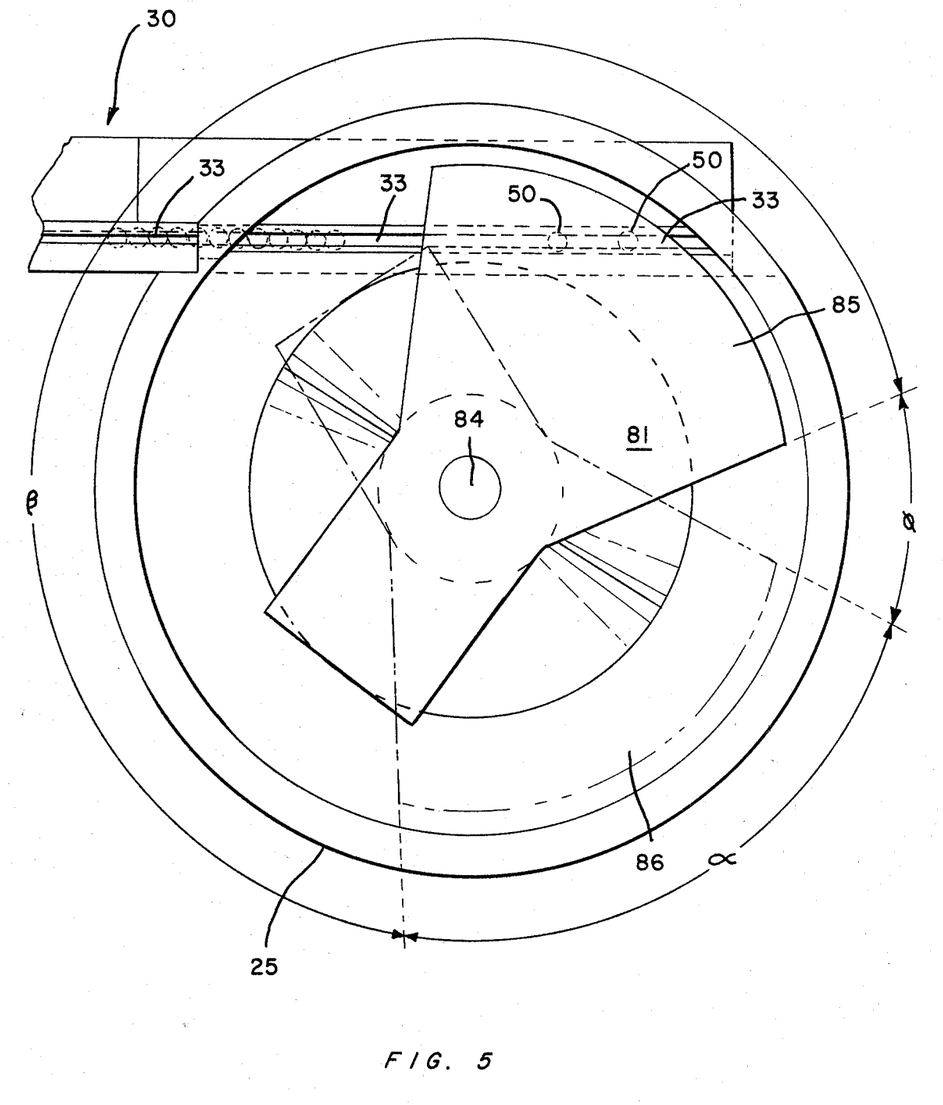
FIG. 5 is a veiw of the invention looking down into the reservoir along the axis thereof and showing more clearly the relationship between the position of the track and the reservoir.

The sweep and coverage of brush 81 is shown more specifically in FIG. 5. However, before referring to FIG. 5 for a detailed description thereof, reference is made to FIG. 4 which shows a sectional view of the overall structure of FIG. 2 along the plane X—X which passes vertically through the slot 33 of the track 26.

In FIG. 4 a portion of the vertical section 75 of walls of reservoir 25 is shown in the afore-mentioned vertical plane passing through the slot 33 of FIG. 2. The bottom surface 76 represents the top surface of the window 43 in the wall of the reservoir 25 through which the socket connectors 50 pass, said window being shown both in FIG. 2 and FIG. 3.

It can be seen that the distance $D_3$ between the bottom surface 76 and the top surface 88 of the rail 37 which is equal to the distance $D_3$ is sufficient to allow the button-shaped tops 54 of the sockets, such as sockets 50' and 50" to pass thereunder. However, the distance $D_3$ is not so great as to allow the sockets 50 to become tilted as they pass under the surface 76 and around the angled portion 32 on their way down into the track portion 30 which is at a 40° angle with the horizontal.

Similarly, the distance $D_4$ between the bottom surface 89 of the overhang element 51 and the top surface 90 of the rail 37 is sufficient to permit the connector, such as connector 50, to slide down the track 30 and into the work station 19 of FIG. 1. However, such distance $D_4$ is not so great as to permit the connector 50 to be vibrated out of the slot 33 and thereby produce a jamming of the flow of connectors down the main track section 30.

Referring now more specifically to the structure of FIG. 5 there is shown two positions 85 and 86 of the brush 80, with the position 85 representing the extreme clockwise position of brush 80 and the position 86 representing the extreme counter-clockwise position of brush 80. The total angular oscillatory motion of the brush is represented by the angle $\beta + \alpha$ in FIG. 5. As can be seen from FIG. 5 there remains an angle $\phi$ through which no portion of the brush travels. In fact, however, the angular sweep of the brush 80 is a matter of design and, if desired, can easily be made to oscillate back and forth to cover a complete 365° sweep so that the angle $\phi$ becomes zero. Alternatively, the brush 80 can be made to sweep in a counter-clockwise direction a given number of times, for example five or ten times, and then to sweep in the opposite or clockwise direction a given number of times, for example once or twice. These variations in the amount of sweep in the brush and in the relative number of times a brush sweeps in either direction, are matters of design and will vary in efficiency with the particular configurations of the connector, the reservoir, the track and the respective angles of positions of each of these elements.

It is to be noted that because the slot 33 lies along a chord line of the circular bottom area of the reservoir 25, the brush 80 will sweep back and forth cross the slot 33 with a strong component of the brush motion being parallel to the slot 33. Such parallel components of motion will function to produce two definite advantages over that prior art structure in which the slot 33 extends radially to the center of the circular area of the reservoir.

More specifically, in the structure shown in FIG. 5, the parallel component of motion when the brush is moving in a counter-clockwise direction, will function to push the connectors hanging in the slot 33 to the left in FIG. 5 and down into the main track section 30 and towards the work station 19 (FIG. 1).

When the brush is moving in the clockwise direction in FIG. 5, the component of motion which is parallel to slot 33 will function to remove from the slot 33 any connectors which are not properly positioned within the slot 33. It has been found that if the connectors 50 are properly positioned within the slot 33 with the main cylindrical body portion 55 (see FIG. 2a) hanging down into the slot 33, the bristles 80 of brush 81 will not exert a sufficient force upon the button-like heads 54 thereon to remove such properly positioned connectors from the slot 33. Only those connectors which are not properly positioned within the slot 33, namely those connectors, for example, which are hanging in the slot 33 at some improper angle, will be swept out of the slot 33 or alternatively, will be forced down into the slot 33 to become properly aligned therein.

In FIGS. 2 and 5 the track rails 37 and 38 and the slot 33 therebetween which extend across the bottom surface of the reservoir 25 are shown as being an extension of the track portion 30 which extends from the reservoir 25 down to the work area 19 of FIG. 1. However, an alternative structure is to form the actual bottom surface of the reservoir 25 to function as a continuation of the track extending from the reservoir 25 down to the work station. In this manner this can be accomplished by milling the bottom surface of the reservoir 25 in the proper manner and then mating or joining the reservoir 25 to the track portion 30 to produce the overall configuration shown generally in FIG. 2.

On the other hand, by retaining the track portion extending across the bottom surface of the reservoir 25 as an integral part of the track portion 30 extending from resevoir 25 down to work station 19 of FIG. 1, it is possible to remove the complete track portion, including sections 31 and 30 which are integrally connected together, from the reservoir 25 and replacing it with a complete track having somewhat different dimensions to accommodate a connector of a different size and possibly of a different configuration. Furthermore, by maintaining both sections 31 and 30 of the track as an integral part it is also possible to replace a given reservoir 25 with another reservoir having a different configuration and different angular relationship to the main track to accommodate the feed characteristics required for another type of connector having a different size and configuration.

Further, the angle that the main track section 30 makes with the horizontal need not be 40°. Such angle can be anywhere within the approximate range of 20° to 60°, depending upon the parameters of the system, including the configuration of the components, the reservoir, the rate of installation of the installation equipment, and other factors. Similarly the angles of inclination of the reservoir can vary in accordance with the needs of a particular application.

While that portion of the track within the cylindrically-shaped reservoir 25 is shown in the figures herein as comprising a straight slot which follows a chord line of the circular bottom surface of reservoir 25, such portion of the track can have other configurations. More specifically, such portion of the track slot can be curved with the concave side thereof facing the axis 84 of brush 81 but lying in between the post 84 and the wall of reservoir 25. Such a configuration of the track will enable a larger component of the motion of the bristles of the brush 81 to be tangential to the slot as the brush passes thereover, than is the case where the slot is straight and follows a chord line of the bottom surface of reservoir 25.

It is to be understood that the forms of the invention shown and described herein is but a preferred embodiment thereof and that various changes can be made in the structure, such as for example, angles of the track portion extending from the reservoir to the work station with respect to the horizontal plane, and angles of the bottom surface of the reservoir both with respect to the horizontal plane and also dimensions of the various elements without departing from the spirit or scope of the invention.

I claim:

1. A connector feeder assembly for feeding connectors of the general type having a tubular body with one end thereof being outwardly flared from a source to a destination and comprising:

a cylindrically-shaped receptacle with a bottom for holding a supply of said connectors and further having an aperture in the wall thereof;

a track having a slot constructed to hold said connectors in a given position by their flared ends with their tubular bodies hanging in said slot and having a first portion extending along said bottom of said cylindrically-shaped receptacle and through said aperture in the wall of said receptacle, and an external second portion extending downwardly to said destination and providing a continuation of said first portion in the plane thereof;

said first portion of said track positioned at the bottom of said receptacle along a chord of said predetermined path adjacent the wall of said receptacle; and rotatable brush means having its axis of rotation coincident with the axis of said cylindrically-shaped receptacle and comprising bristles positioned to respond to the rotation of said brush to sweep areas of the bottom surface of said receptacle; and means for moving said brush in a predetermined pattern of clockwise and counter-clockwise directions to sweep said bristles across predetermined areas of the bottom surface of said receptacle, including the said first portion of said track;

said cylindrically-shaped receptacle being positioned with its axis tipped toward said first portion and substantially in the direction in which the second portion extends.

2. A connector feeder assembly according to claim 1 wherein the upper edges of the walls defining the slot in the first portion of the track are horizontal.

* * * * *